(12) United States Patent
Gadkaree et al.

(10) Patent No.: US 8,482,901 B2
(45) Date of Patent: Jul. 9, 2013

(54) MICROPOROUS ACTIVATED CARBON FOR EDLCS

(75) Inventors: Kishor Purushottam Gadkaree, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 243 days.

(21) Appl. No.: 12/970,073

(22) Filed: Dec. 16, 2010

(65) Prior Publication Data

US 2011/0182000 A1  Jul. 28, 2011

Related U.S. Application Data

(60) Provisional application No. 61/297,469, filed on Jan. 22, 2010.

(51) Int. Cl.
*H01G 9/00* (2006.01)
*H01G 9/04* (2006.01)

(52) U.S. Cl.
USPC ............... 361/502; 361/508; 361/516

(58) Field of Classification Search
None
See application file for complete search history.

(56) References Cited

U.S. PATENT DOCUMENTS

| | | | | |
|---|---|---|---|---|
| 5,206,207 | A | 4/1993 | Tolles | 502/424 |
| 5,710,092 | A | 1/1998 | Baker | 502/416 |
| 7,232,790 | B2 * | 6/2007 | Tanaka et al. | 502/427 |
| 7,835,136 | B2 * | 11/2010 | Feaver et al. | 361/502 |
| 2002/0036883 | A1 | 3/2002 | Noguchi et al. | 361/502 |
| 2002/0048144 | A1 | 4/2002 | Sugo et al. | 361/502 |
| 2005/0014643 | A1 | 1/2005 | Lini et al. | 502/432 |
| 2009/0097188 | A1 | 4/2009 | Mitchell | 361/502 |
| 2009/0124485 | A1 | 5/2009 | Plee | 502/101 |

FOREIGN PATENT DOCUMENTS

| | | |
|---|---|---|
| JP | 5101980 A | 4/1993 |
| JP | 7201674 A | 8/1995 |
| JP | 10116755 A | 5/1998 |
| JP | 2004047613 A | 2/2004 |
| JP | 2004067498 A | 3/2004 |
| JP | 2007302512 A | 11/2007 |
| WO | WO 2008053919 | 5/2008 |
| WO | 2008/098841 A1 | 8/2008 |

OTHER PUBLICATIONS

Ahmadpour, et al., The Preparation of Active Carbons From Coal by Chemical and Physical Activation, Elsevier Science Ltd., Carbon vol. 34, No. 4, pp. 471-479, (1996).

Ahmadpour, et al, The Preparation of Activated Carbon From Macadamia Nutshell by Chemical Activation, Elsevier Science Ltd., Carbon vol. 35, No. 12, pp. 1723-1732, (1997).

H. P. Boehm, Some Aspects of the Surface Chemistry of Carbon Blacks and Other Carbons, Elsevier Science Ltd., Carbon, vol. 32, No. 5, pp. 759-769, (1994).

(Continued)

*Primary Examiner* — Jayprakash N Gandhi
*Assistant Examiner* — Dion Ferguson
(74) *Attorney, Agent, or Firm* — Michael W. Russell (57) ABSTRACT

An electric double layer capacitor electrode includes microporous carbon, wherein the microporous carbon includes pores having a size of 1 nm or less, which provide a combined pore volume of at least 0.3 cm$^3$/g, pores having a size of from 1 nm to 2 nm, which provide a combined pore volume of at least 0.05 cm$^3$/g, and less than 0.15 cm$^3$/g combined pore volume of any pores having a size greater than 2 nm.

17 Claims, 5 Drawing Sheets

OTHER PUBLICATIONS

Cadek, et al., Bio-Based Materials for Supercapacitor, *ISGL Group—The Carbon Company*.

Kadlec, et al., Structure of Pores of Active Carbons Prepared by Water-Vapour and Zinc-Dichloride Activation, Pergamon Press. Carbon, vol. 8, pp. 321-331, (1970).

Pandolfo, et al., Review—Carbon Properties and Their Role in Supercapacitors, Elsevier, Journal of Power Sources 157,11-27, (2006).

Teng, et al., Preparation of Porous Carbons From Phenol-Formaldehyde Resins With Chemical and Physical Activation, Pergamon, Carbon 38, 817-824, (2000).

Tennison, S.R., Phenolic-Resin-Derived Activated Carbons, Elsevier Science Ltd., Applied Catalysis A: General 173, 289±311, (1998).

Treusch, et al., Basic Properties of Specific Wood-Based Materials Carbonised in a Nitrogen Atmosphere, Wood Sci Technol 38: 323-333, (2004).

Yue, et al., Preparation of Fibrous Porous Materials by Chemical Activation 1. ZNCL Activation of Polymer-Coated Fibers, Elsevier Science Ltd., Carbon 40, 1181-1191, (2002).

Shimodaira, et al., Structural Information From the Raman Spectra of Activated Carbon Materials, Research Center, Asahi Glass Co. Ltd.

\* cited by examiner

Fig. 5 ical Application No. 61/297,469, filed Jan. 22, 2010, the entire contents of which are incorporated herein by reference.

BACKGROUND AND SUMMARY

The present disclosure relates generally to activated carbon materials and more specifically to electric double layer capacitors comprising activated carbon-based electrodes.

Energy storage devices such as ultracapacitors may be used in many applications such as where a discrete power pulse is required. Example applications range from cell phones to hybrid vehicles. Energy storage devices typically comprise a porous separator and/or an organic electrolyte sandwiched between a pair of carbon-based electrodes. The energy storage is achieved by separating and storing electrical charge in the electrochemical double layer at the interfaces between the electrolyte and the electrodes. Important characteristics of these devices are the energy density and power density that they can provide, which are both largely determined by the properties of the carbon-based electrodes.

Carbon-based electrodes suitable for incorporation into high energy density devices are known. The carbon materials, which form the basis of such electrodes, can be made from natural or synthetic precursor materials. Known natural precursor materials include coals, nut shells, and biomass, while synthetic precursor materials typically include phenolic resins. With both natural and synthetic precursors, carbon materials can be formed by carbonizing the precursor and then activating the resulting carbon. The activation can comprise physical (e.g., steam) or chemical activation.

A property of the carbon that can influence its success when incorporated into high energy density devices such as electric double layer capacitors (EDLCs) is the material's specific capacitance. Higher specific capacitance generally results in a higher volumetric energy density of the resulting device. Accordingly, it would be an advantage to provide activated carbon materials as well as methods for making activated carbon materials having a high specific capacitance. Such materials can be used to form carbon-based electrodes that enable higher energy density devices.

According to one embodiment, an electric double layer capacitor electrode includes microporous carbon, wherein the microporous carbon includes pores having a size of 1 nm or less, which provide a combined pore volume of at least 0.3 cm$^3$/g, pores having a size of from 1 nm to 2 nm, which provide a combined pore volume of at least 0.05 cm$^3$/g, and less than 0.15 cm$^3$/g combined pore volume of any pores having a size of greater than 2 nm.

Additional features and advantages of the invention will be set forth in the detailed description which follows, and in part will be readily apparent to those skilled in the art from that description or recognized by practicing the invention as described herein, including the detailed description and the claims.

It is to be understood that both the foregoing general description and the following detailed description present embodiments of the invention, and are intended to provide an overview or framework for understanding the nature and character of the invention as it is claimed.

The accompanying drawings are included to provide a further understanding of the invention, and are incorporated into and constitute a part of this specification. The drawings illustrate various embodiments and together with the description serve to explain the principles and operations of the invention.

DETAILED DESCRIPTION

According to one embodiment of the disclosure, an electric double layer capacitor electrode includes microporous carbon, wherein the microporous carbon comprises pores having a size of up to 1 nm, which provide a combined pore volume of at least 0.3 cm$^3$/g, pores having a size of from 1 nm to 2 nm, which provide a combined pore volume of at least 0.05 cm$^3$/g, and less than 0.15 cm$^3$/g combined pore volume of any pores having a size of greater than 2 nm.

As defined herein, microscale pores have a pore size of 2 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity). The carbon material made using the method can have a specific surface area greater than about 300 m$^2$/g, i.e., greater than 300, 350, 400, 500 or 1000 m$^2$/g. By way of example, the microporous carbon material can have a specific surface area less than 2500 m$^2$/g, i.e., less than 2500, 2000, 1500, 1200 or 1000 m$^2$/g.

The performance of EDLCs comprising carbon-based electrodes can be intimately related to the properties of the carbon. Specifically, the total available porosity and pore size distribution can impact EDLC performance. It has been commonly thought that significant quantities of mesopores are needed for electrolyte ion access to the interior surfaces of the carbon material. In this disclosure, it is demonstrated that an activated carbon that is predominantly microporous with little mesoporosity exhibits superior performance and significantly higher volumetric specific capacitance (or energy density) in an EDLC than commercial carbons that have a substantial amount of mesoporosity. This advantage is attributable to the unique pore size distribution of the carbon materials disclosed herein.

According to embodiments, a carbon-based electrode for an EDLC comprises activated carbon material having a total porosity greater than 0.4 cm$^3$/g (e.g., greater than 0.4, 0.45, 0.5, 0.55, 0.6, 0.65 or 0.7 cm$^3$/g). The portion of the total pore volume resulting from micropores (d≦2 nm) can be 95% or greater (e.g., at least 95, 96, 97, 98 or 99%) and the portion of the total pore volume resulting from ultramicropores (d≦1 nm) can be 60% or greater (e.g., at least 60, 65, 70, 75, 80, 85, 90 or 95%). The pore size distribution of the activated carbon can include ultramicropores, micropores, mesopores and macropores and may be characterized as having a unimodal, bimodal or multi-modal pore size distribution. The ultramicropores can comprise 0.3 cm$^3$/g or more (e.g., 0.4 cm$^3$/g or more) of the total pore volume. Pores having a pore size (d) in the range of 1<d≦2 nm can comprise 0.05 cm$^3$/g or more (e.g., at least 0.1, 0.15, 0.2 or 0.25 cm$^3$/g) of the total pore volume. If present, any pores having a pore size greater than 2 nm, which may include mesopores and/or macropores, can comprise 0.15 cm$^3$/g or less (e.g., less than 0.1 or 0.04 cm$^3$/g) of the total pore volume.

In various embodiments, the microporous activated carbon can be formed from a lignocellulosic or non-lignocellulosic carbon precursor. An example method for producing an activated carbon material comprises heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, and removing the inorganic compound from the first carbon material to produce a microporous activated carbon material.

In the foregoing example, the natural non-lignocellulosic carbon precursor can be heated at a temperature effective to carbonize the precursor material. Example carbonization temperatures are greater than about 450° C. (e.g., at least 450, 500, 550, 600, 650, 700, 750, 800, 850 or 900° C.). The inert or reducing atmosphere used during carbonization of the carbon precursor can comprise a gas or gas mixture of one or more of hydrogen, nitrogen, ammonia, helium or argon.

After carbonization of the carbon precursor, the resulting first carbon material can be mixed with an inorganic chemical activating agent. The inorganic compound used to activate the first carbon material can include an alkali hydroxide or chloride (e.g., NaOH, KOH, NaCl, KCl), phosphoric acid, or other suitable salt such as $CaCl_2$ or $ZnCl_2$.

The first carbon material and inorganic compound can be combined in any suitable ratio. A ratio (wt. %/wt. %) of first carbon material to inorganic compound can range from about 10:1 to 1:10 (e.g., 9:1, 8:1, 7:1, 6:1, 5:1 4:1, 3:1, 2:1, 1:1, 1:2, 1:3, 1:4, 1:5, 1:6, 1:7, 1:8 or 1:9).

Advantageously, the step of mixing can comprise mixing the first carbon material with an aqueous mixture of the inorganic compound. During the mixing, the inorganic compound can be homogeneously or substantially homogeneously mixed with the first carbon material. In one approach, the inorganic compound is initially dissolved in a solvent such as water. The solution comprising the inorganic compound is then combined with the first carbon material, and the resulting mixture can be allowed to age for an amount of time effective to permit thorough mixing of the inorganic compound with the first carbon material. By way of example, the mixture can be aged for 0.5, 1, 2, 4, 8 or more hours (e.g., from 0.5 to 8 hours).

After the inorganic compound is mixed with the first carbon material and optionally aged, the mixture is heated at a temperature effective to incorporate the inorganic compound into the first carbon material. The mixture can be heated at a temperature from about 300° C. to 1000° C. in an inert or reducing environment for a predetermined time (e.g., 0.5, 1, 2, 4, 8, or more hours) in order to activate the carbon.

Following carbonization/activation, the activated carbon product can be washed to remove both the inorganic compound and any chemical species derived from reactions involving the inorganic compound, dried and optionally ground to produce material comprising a substantially homogeneous distribution of porosity.

A preferred solvent for extracting the inorganic compound is water. Optionally, the extraction solvent can include an acid. One process for removing the inorganic compound involves sequentially rinsing the activated carbon material with water and acid. A further process for removing the inorganic compound involves rinsing the activated carbon material with an aqueous acid mixture (e.g., mixture of acid and water). Acids used during the extraction can include hydrochloric acid. The process of extracting the inorganic compound forms a microporous, activated carbon material, the pores being defined by the volume previously filled by the inorganic compound.

The performance (energy and power density) of an ultracapacitor depends largely on the properties of the activated carbon material that makes up the electrodes. The activated carbon formed according to the foregoing method can be used to form carbon-based electrodes for economically viable, high power, high energy density devices. The properties of the activated carbon material, in turn, can be gauged by evaluating the porosity and pore size distribution of the material, the nitrogen content, the oxygen content, the structural order of the carbon atoms, and the electrical properties of the activated carbon material when incorporated into a carbon-based electrode. Relevant electrical properties include the area-specific resistance, and the specific capacitance.

The microporous activated carbon material can have a nitrogen content greater than 0.1 wt. % and as high as, for example, about 5 wt. % (e.g., greater than 0.1, 0.2, 0.5, 1, 1.5, 2, 2.5, 3, 3.5, 4, 4.5 or 5 wt. %). Microporous activated carbon materials derived from non-lignocellulosic precursors, for example, can have a nitrogen content that is greater than the nitrogen content of resin-derived activated carbon. Without wishing to be bound by theory, the incorporation of nitrogen into activated carbon is believed to decrease resistance and increase capacitance, and thus improve the efficacy of such activated carbon when used in the form of carbon-based electrodes in electrochemical cells such as EDLCs. In the processes disclosed herein, nitrogen can incorporated into the microporous activated carbon material during carbonization/activation and advantageously without the need for additional processing steps.

Optionally, the oxygen content in the microporous activated carbon can be decreased by heating the microporous activated carbon material in an inert or reducing atmosphere to form a low oxygen content, microporous activated carbon material. The oxygen content decreasing heat treatment step includes heating the microporous activated carbon in an inert or reducing atmosphere to a temperature effective to decrease the oxygen content in the activated carbon.

A furnace temperature that can be used in conjunction with an inert or reducing gas to decrease the oxygen content in the activated carbon ranges from about 200° C. to 1200° C. (e.g., 200, 250, 300, 350, 400, 450, 500, 550, 600, 650, 700, 750, 800, 850, 900, 950, 1000, 1050, 1100, 1150 or 1200° C.). Suitable inert gases include nitrogen ($N_2$) and argon (Ar). In embodiments, a reducing gas can include hydrogen ($H_2$), ammonia ($NH_3$) or a gas mixture comprising hydrogen and nitrogen (i.e., forming gas). The hydrogen content in the gas mixture can be 6% or less (e.g., less than 6, 5, 4, 3, 2, or 1% $H_2$). According to an embodiment, a low oxygen content, microporous activated carbon material has an oxygen content of less than 5 wt. % (e.g., less than 5, 4.5, 4, 3.5, 3, 2.5, 2, 1.5, 1 or 0.5 wt. %).

The nitrogen content (wt. %) of select samples was determined using a Thermo Flash analyzer. The technique is the classical Dumas method, which uses thermal conductivity detection (TCD), and is described by ASTM D5373 and ASTM D5291. Weighed samples are combusted in oxygen at 950° C. The combustion products (including $N_2$ and $NO_x$) are swept with a helium carrier gas through combustion catalysts, scrubbers, and through a tube filled with reduced copper. The copper removes excess oxygen and reduces $NO_x$ to $N_2$. The $N_2$ is then separated from other gases on a chromatography column and measured with TCD. Oxygen content (wt. %) is measured according to ASTM D5622 (Huffman Laboratories, Inc.).

The carbon structural order can be determined from powder samples using low angle X-ray diffraction (XRD). To prepare samples for XRD, powdered activated carbon material is lightly ground in an agate mortar and pestle. The ground sample is pressed into a Bruker-AXS powder sample holder. X-ray diffraction results are obtained using copper $K_\alpha$ radiation (1.5406 Å) on a Bruker-AXS D4 Endeavor X-ray diffractometer over a 2-theta angular range of 0.5-20 degrees with a step size of 0.02 degrees and a dwell time of 1 second.

The carbon structural ratio is computed as a normalized intensity of the X-ray reflection at 60 Angstroms. Specifically, the intensity of the diffracted beam at a d-spacing of 60 Angstroms ($I_{60}$) is divided by the positive difference between the intensity at a d-spacing of 176 Angstroms ($I_{176}$) and the intensity at a d-spacing of 15 Angstroms ($I_{15}$). Thus, the carbon structural order ratio is defined herein as $SOR=I_{60}/|(I_{176}-I_{15})|$.

In one embodiment, an activated carbon material derived, for example, by carbonizing and activating a non-lignocellulosic carbon precursor, has a structural order ratio less than or equal to 0.08, a nitrogen content greater than 0.1 wt. %, and an oxygen content of less than 3 wt. %. Additional aspects of activated carbon materials are disclosed in commonly-owned U.S. patent application Ser. No. 12/335,044, the contents of which are incorporated by reference herein.

Figure 1:
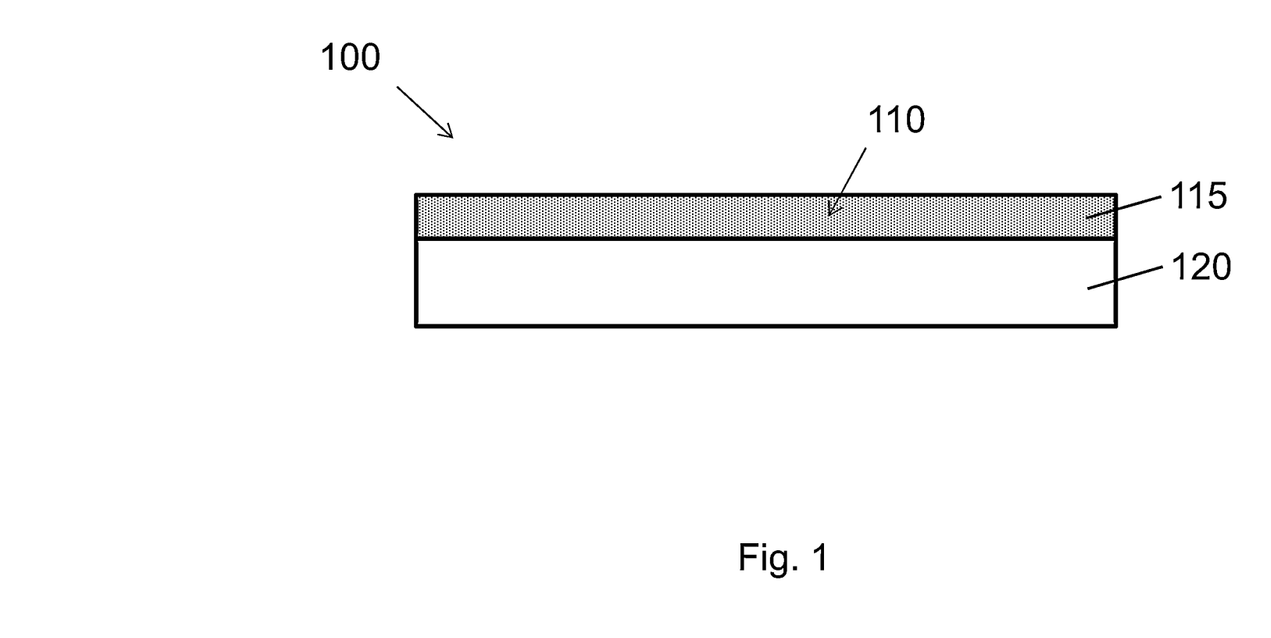
FIG. 1 is a schematic of an electric double layer capacitor electrode comprising macroporous carbon.

Once formed, the microporous activated carbon can be incorporated into a carbon-based electrode 100. In a typical electric double layer capacitor (EDLC), a pair of carbon-based electrodes is separated by a porous separator and the electrode/separator/electrode stack is infiltrated with a liquid organic or inorganic electrolyte. The electrodes, as depicted schematically in FIG. 1, comprise activated carbon powder 110 that has been mixed with other additives (e.g., binders) and compacted into a thin sheet 115 and laminated to a conductive metal current collector backing 120.

One method for producing a carbon-based electrode comprises heating a suitable carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce a microporous carbon material, optionally heating the microporous carbon material in an inert or reducing atmosphere to decrease the oxygen content in the activated carbon, and forming a carbon-based electrode from the activated carbon.

By way of example, a carbon paper having a thickness in the range of about 100-300 micrometers can be prepared by rolling and pressing a powder mixture comprising 60-90 wt. % microporous activated carbon, 5-20 wt. % carbon black and 5-20 wt. % PTFE. Carbon sheets can be stamped or otherwise patterned from the carbon paper and laminated to a conductive current collector to form a carbon-based electrode. The carbon-based electrode can be incorporated into an energy storage device. During use, an electric double layer can form via the stored charge that accumulates on opposing electrodes. The amount of charge stored in the electric double layer impacts the achievable energy density and power density of the capacitor.

According to an embodiment, an electrochemical cell comprises a first electrode comprising a microporous activated carbon material, a porous separator, and a pair of electrically conductive substrates, wherein the porous separator is disposed between the first electrode and a second electrode, and the first and second electrodes are each in electrical contact with a respective electrically conductive substrate. Optionally, the second electrode can comprise a microporous activated carbon material.

Electrical properties (e.g., volumetric capacitance and gravimetric capacitance) of microporous activated carbon materials can be evaluated by measuring the characteristics of carbon-based electrodes. The carbon-based electrodes evaluated herein include 85 wt. % activated carbon material, 5 wt. % conductive carbon (e.g., Black Pearls®, which is marketed by Cabot Corporation, Boston, Mass.), and 10 wt. % Teflon® (PTFE). A button cell can be formed by punching carbon electrodes having a diameter of 0.625 inches from sheets of the electrode material. A separator is placed between identical carbon electrodes which, in turn, are sandwiched between two conductive carbon-coated aluminum current collectors. A thermoset polymer ring is formed around the periphery of the carbon electrodes to seal the cell, which is filled with an organic electrolyte such as 1.5M tetraethylammonium-tetrafluoroborate (TEA-TFB) in acetonitrile.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C\frac{dV}{dt} \quad (1)$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{dV/dt} \quad (2)$$

The cell capacitance is the harmonic sum of two individual capacitances represented by the electrochemical double layer capacitance of each of the carbon electrodes (capacitors in series). This relationship can be expressed as:

$$\frac{1}{C_{cell}} = \frac{1}{C_1} + \frac{1}{C_2} \quad (3)$$

where $C_1$ and $C_2$ are the double layer capacitances of the individual carbon electrodes in the cell.

The magnitudes of these capacitances can be correlated to the volumetric specific capacitance of the carbon electrodes as:

$$C_1 = C_{sp,1} \times V_1 \quad (4)$$

$$C_2 = C_{sp,2} \times V_2 \quad (5)$$

where $C_{sp,1}$ and $C_{sp,2}$ are specific capacitances of the individual carbon electrodes (in F/cm$^3$) and $V_1$ and $V_2$ are the corresponding electrode volumes. Because the test cell uses electrodes having identical size and composition, $C_1 = C_2$, $C_{sp,1} = C_{sp,2}$ ($=C_{sp}$) and $V_1 = V_2$ ($=V_{total}/2$, where $V_{total}$ is the total volume (cm$^3$) of carbon electrodes in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \quad (6)$$

or, $$C_{sp} = \frac{4 \times C_{cell}}{V_{total}} \quad (7)$$

The energy storage device can include an ultracapacitor. Ultracapacitors can have a jelly roll design, prismatic design, honeycomb design, or other suitable configuration. A carbon-based electrode can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene). In addition to its use in energy storage devices, the activated carbon can be used as a catalyst support or as media for adsorption/filtration.

Microporous activated carbon produced using a non-lignocellulosic precursor offers significantly higher energy storage capacity in EDLCs compared to major commercial carbons. For example, when the microporous activated carbon according to the present disclosure is incorporated into a carbon-based electrode also comprising carbon black and PTFE, the gravimetric specific capacitance is greater than 110 F/g (e.g., 110, 120, 130, 140, 150, 160, 170 or 180 F/g) and the volumetric specific capacitance is greater than 70 F/cm$^3$ (e.g., 70, 75, 80, 85, 90, 92, 94, 96, 98 or 100 F/cm$^3$).

As used herein, unless expressly defined otherwise, "natural, non-lignocellulosic carbon precursor" means at least one natural, non-lignocellulosic carbon precursor. A substance that contains both cellulose and lignin is lignocellulosic and, for example, can include any of several closely-related substances constituting the essential part of woody cell walls of plants having cellulose intimately associated with lignin. The non-lignocellulosic carbon precursors are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix. Typical lignocellulosic fibers from agriculture are found, for example, in straws, hemp, flax, sisal, and jute.

The natural, non-lignocellulosic carbon precursor can be derived from an edible grain such as wheat flour, walnut flour, corn flour, corn starch, rice flour, and potato flour. Other natural, non-lignocellulosic carbon precursors include coffee grounds, potatoes, beets, millet, soybean, rape, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typically make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

EXAMPLES

The invention will be further clarified by the following examples.

Example 1

Wheat flour (3000 g) is placed in a graphite crucible and heated in a retort furnace (CM Furnaces model 1216FL). The furnace temperature is increased at a heating rate of 150° C./hr from room temperature to 800° C., maintained at 800°

C. for 2 hrs, and then allowed to cool down naturally to 70° C. or less. During the foregoing heating/cooling cycle, the furnace is purged with $N_2$.

As a result of heating under flowing $N_2$, the wheat flour is carbonized and converted to a first carbon material. The first carbon material can be ground to a powder using a hammer pound, pulverization and vibramilling. The ground carbon powder can have a particle size ($d_{50}$) of 10 micrometers or less (e.g., 1, 2, 5 or 10 micrometers).

The powdered first carbon material (300 grams) is mixed with 1500 grams of a 45 wt. % aqueous solution of KOH. The resulting mixture is stirred and heated at about 100° C. on a hot plate until the liquid is removed and a solid cake is formed. The cake can be broken into smaller pieces by mechanical force.

The carbon/KOH mixture is placed in SiC crucibles (Hexyloy® SA grade) and heated in a retort furnace. The furnace temperature is increased at a heating rate of 150° C./hr from room temperature to 750° C., maintained at 750° C. for 2 hours, and then allowed to cool down naturally to a temperature of about 100° C. During this heating/cooling cycle, the furnace is purged with $N_2$. By heating the carbon/KOH mixture, the KOH can be incorporated into the first carbon material During cooling, once the furnace temperature reaches 100° C., the furnace temperature is maintained at 100° C. for 3 additional hours during which time the furnace is purged with $N_2$ saturated with water vapor. Nitrogen gas saturated with water vapor can be produced by bubbling $N_2$ gas through 95° C. de-ionized water. The furnace is then allowed to cool down naturally to 70° C. or lower.

The resulting activated carbon can then be washed to remove excess potassium, potassium compounds, and other impurities. Washing can comprise rinsing the activated carbon with water or, according to an embodiment, alternately rinsing the activated carbon with water and a mixture of water and acid. One example washing sequence is disclosed below.

In a first washing step, the activated carbon is combined with 3000 mL of de-ionized water and the mixture is stirred and heated on a hot plate at a temperature of from about 90 to 100° C. for 30 minutes. Solid material (i.e., carbon) is separated from the liquid by vacuum-assisted filtration.

In a second washing step, the previously-obtained carbon material is combined first with 1980 mL of de-ionized water and then 990 mL of 37% aqueous HCl. The mixture is stirred and heated on a hot plate at a temperature of from about 90 to 100° C. for 60 minutes, after which the solid material is separated from the liquid by vacuum-assisted filtration.

In a third washing step, the previously-obtained carbon material is combined with 3000 mL of DI water. The mixture is stirred and heated on a hot plate at a temperature of from about 90 to 100° C. for 60 minutes. The carbon material is then separated from the liquid by vacuum-assisted filtration.

The third washing step is then repeated until the pH of the effluent liquid is the same as that of the de-ionized water used for washing. Finally, the activated carbon is dried in a vacuum oven at 125° C. for 18 hours to produce a second carbon material. The second carbon material comprises microporous, activated carbon powder.

In order to decrease the oxygen content in the activated carbon material, the activated carbon material can be treated with an additional heat treatment, which includes heating the activated carbon material in an inert or reducing atmosphere.

In an embodiment, the microporous activated carbon material is placed in SiC crucibles and loaded into a furnace (CM Furnaces model 1216FL or 1212FL). The furnace temperature is increased at a heating rate of 150° C./hr to a temperature of about 800° C., maintained at temperature for 2 hours, and then allowed to cool down naturally. During the foregoing heating/cooling cycle, the furnace is constantly purged with either $N_2$ or a mixture of $H_2$ and $N_2$.

Upon cooling, once the furnace temperature has reached 100° C., it is maintained at 100° C. for 3 additional hours during which time the furnace is purged with $N_2$ saturated with water vapor. The furnace is then allowed to cool down naturally to 70° C. or lower. The resulting activated carbon product can be dried in a vacuum oven at 125° C. for 18 hours.

Example 2

Differences in the pore size distribution and the resulting capacitance data between non-lignocellulosic activated carbon and commercially-available activated carbon are illustrated in the following example.

Pore size data is determined for both carbon samples using $N_2$ adsorption on a Micromeritics ASAP 2420 and calculated using the Density Functional Theory (DFT) assuming slit pores.

Pore size distribution data for a microporous activated carbon material made according to Example 1 is shown in Table 1 together with comparative data from a commercially-available carbon material (Kuraray YP-50F). The Example 1 sample (Sample 1) corresponds to the activated carbon material obtained prior to the oxygen-reduction heat treatment.

In Table 1, TPV refers to total pore volume, while "V(<1 nm)," "V(micro)" and "V(meso)" refer to the volume of pores less than 1 nm, the volume of micropores, and the volume of mesopores. The percentage of all pores having a pore size of less than 1 nm, less than 2 nm, and within the range of mesoporous are indicated by "% V<1 nm," "% V<2 nm," and "% V(meso)."

TABLE 1

| | Activated carbon pore structure characteristics | | | | | | |
|---|---|---|---|---|---|---|---|
| Sample | TPV [cm³/g] | V(<1 nm) [cm³/g] | V(micro) [cm³/g] | V(meso) [cm³/g] | % V <1 nm | % V <2 nm | % V(meso) |
| Sample 1 | 0.723 | 0.490 | 0.707 | 0.016 | 68 | 98 | 2 |
| Comparative | 0.589 | 0.268 | 0.543 | 0.046 | 46 | 92 | 8 |

Sample 1 shows a higher total pore volume (0.723 cm³/g) than the Comparative example (0.589 cm³/g). Further, in Sample 1, 98% of the total pore volume was contributed by micropores (i.e. pores smaller than 20 Å) and 2% by mesopores (i.e., pores in the range of 20-500 Å). To break down the distribution further, pores narrower than 10 Å constituted 68% of the total pore volume. Such a high ratio of microporosity to mesoporosity contributes to a decidedly greater specific capacitance for Sample 1 as compared with the commercial carbon.

Capacitance values are obtained by incorporating the activated carbon into a button cell electrode. To form the button cell, activated carbon is combined with carbon black (Black Pearl 2000) and PTFE. The carbon black serves as a conductive additive and the PTFE serves as a binder. The activated carbon, carbon black and PTFE are blended in the proportion of 85:5:10 by weight and rolled into electrodes. A solution of 1.5 M tetraethylammonium tetrafluoroborate (TEA-TFB) in acetonitrile is used as the electrolyte.

As shown in Table 2, the volumetric specific capacitance of Sample 1 is significantly greater than the volumetric specific capacitance of the Comparative example.

TABLE 2

Button cell measurements for activated carbon

| Sample | Volumetric Specific Capacitance, $C_{sp,v}$ [F/cm$^3$] |
|---|---|
| Sample 1 | 96 |
| Sample 5 | 72 |
| Comparative | 67 |

Example 3

Figure 2:
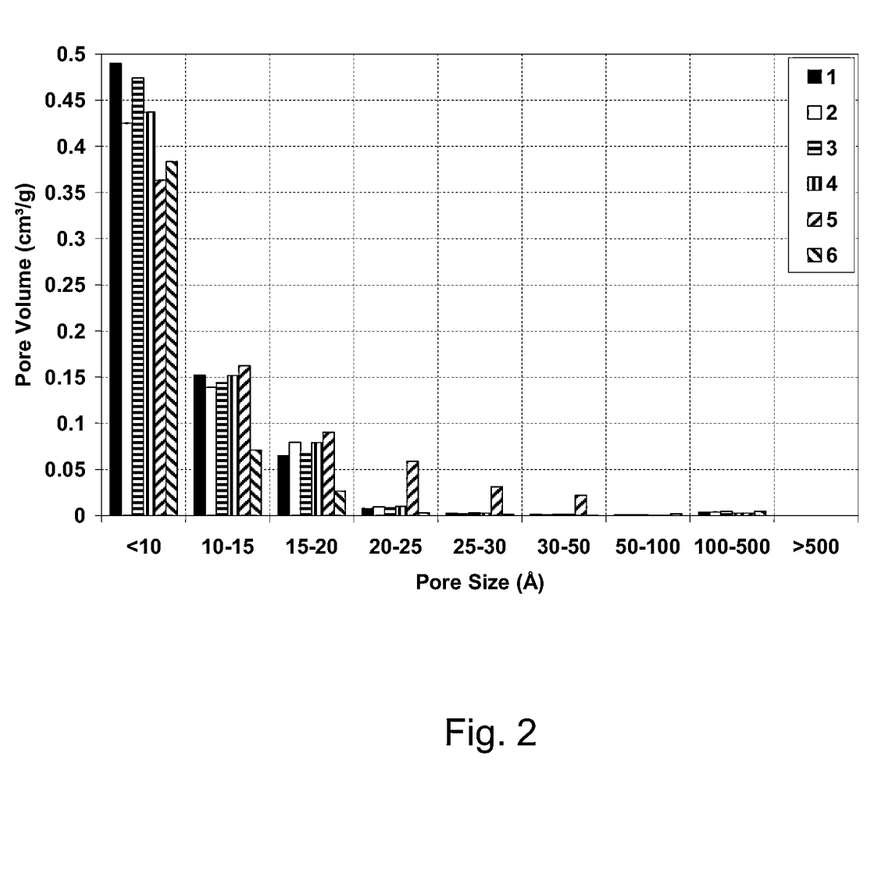
FIG. 2 is graph of pore volume versus pore size for microporous activated carbon materials according to various embodiments.
Figure 3:
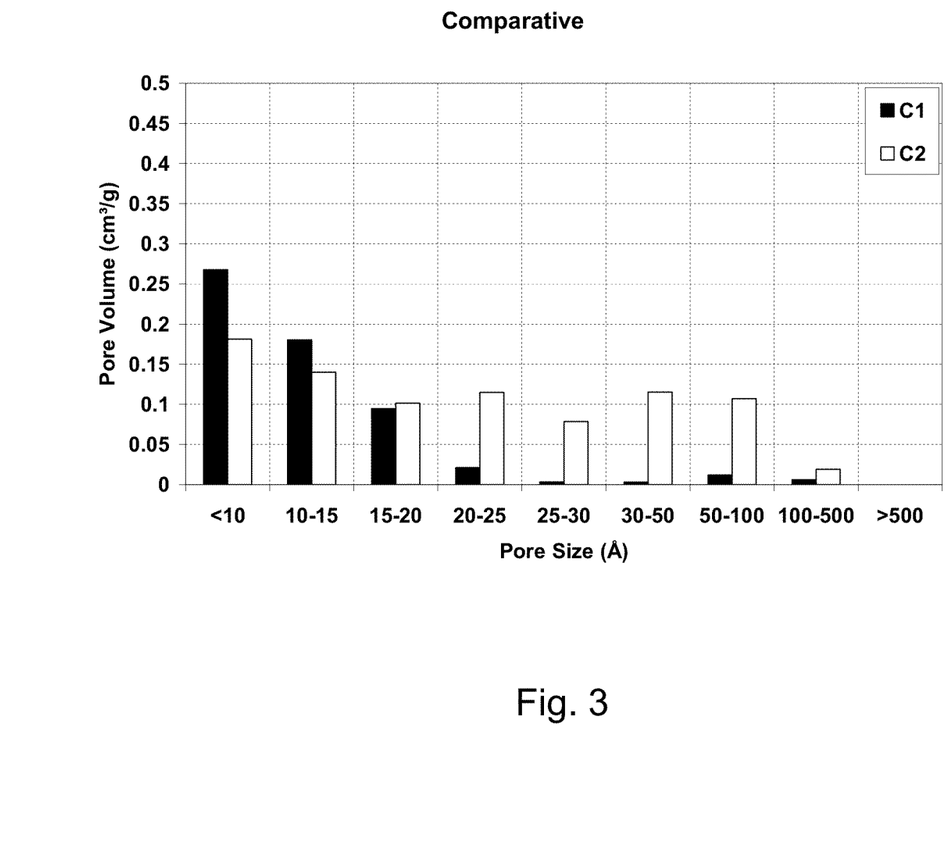
FIG. 3 is graph of pore volume versus pore size for comparative activated carbon materials.

A plot of pore volume versus pore size for microporous activated carbon materials according to various embodiments is shown in FIG. 2. A companion plot showing pore volume versus pore size for commercially-available activated carbon materials (Kuraray YP50F and Supercap BP 10) is shown in FIG. 3. In FIG. 3, the Kuraray material is identified as Sample C1 and the Supercap material is identified as Sample C2. In both Figures, the pore volume is plotted as a total based on the contribution from pores having a specified range of pore sizes.

In FIG. 2, Samples 1-5 are derived from wheat flour, and Sample 6 is derived from corn meal. Process details for preparing the microporous activated carbon materials disclosed in FIG. 2 are disclosed in Example 1, and as with Sample 1, do not include the oxygen-reduction heat treatment. Particular process conditions for Samples 1-6 are outlined in Table 3, which identifies the carbon precursor, carbonization temperature, ratio of KOH to carbonized precursor, and activation temperature. In addition to the Example 1 process parameters, Sample 4 was additionally heated to 700° C. for 2 hr in 1% $H_2/N_2$ following activation.

In lieu of the Example 1 process, Sample 5 was prepared by forming an aqueous mixture (1:2 by weight) of wheat flour and a 45 wt. % KOH solution, drying the mixture at 90-100° C. on a hot plate, heating the dried material at 800° C. in an $N_2$ atmosphere to form a first carbon material, washing the first carbon material sequentially with dilute HCl and water to form a second carbon material, and then drying the second carbon material in a vacuum over at 125° C. for 18 hours.

TABLE 3

Process conditions for microporous activated carbon materials

| Sample # | Precursor | Carbonization Temp. [° C.] | KOH:carbonized precursor ratio | Activation Temp. [° C.] |
|---|---|---|---|---|
| Sample 1 | Wheat flour | 800° C. | 5:1 | 750° C. |
| Sample 2 | Wheat flour | 800° C. | 5:1 | 800° C. |
| Sample 3 | Wheat flour | 800° C. | 5:1 | 750° C. |
| Sample 4 | Wheat flour | 800° C. | 5:1 | 750° C. |
| Sample 5 | Wheat flour | 800° C. | 2:1 | 800° C. |
| Sample 6 | Corn meal | 900° C. | 5:1 | 850° C. |

As seen with reference to FIG. 2, the contribution to the pore volume of ultramicropores (d<1 nm) is greater than 0.3 cm$^3$/g for samples 1-6, and greater than 0.4 cm$^3$/g for samples 1-4. The contribution to the pore volume of pores having a size in the range 1 nm<d<2 nm is at least 0.05 cm$^3$/g, and can be greater than 0.1 or 0.15 cm$^3$/g. Any pores having a size greater than 2 nm contribute, in total, less than 0.15 cm$^3$/g to the pore volume (e.g., less than 0.15, 0.10, 0.05 or 0.025 cm$^3$/g).

Example 4

Figure 4:
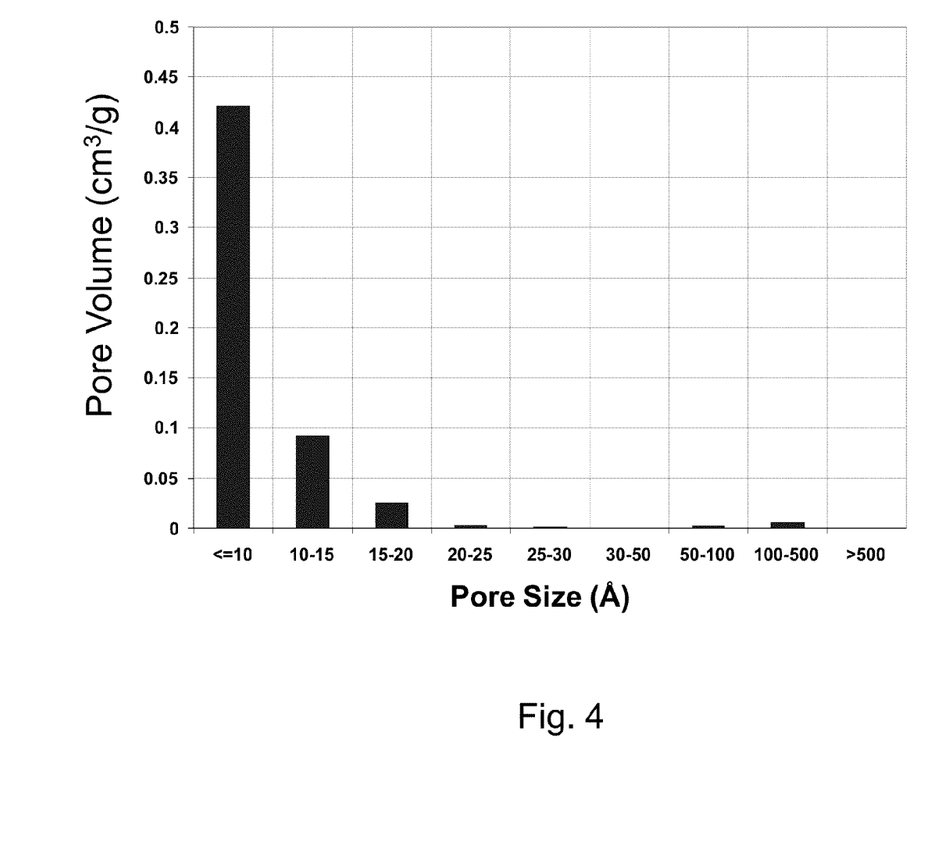
FIG. 4 is graph of pore volume versus pore size for a microporous activated carbon material derived from coconut flour.

The synthesis of Example 1 was repeated using coconut flour (a lignocellulosic material) in lieu of wheat flour. The coconut flour was carbonized in nitrogen, ground, mixed with a KOH solution and then activated. The resulting activated carbon was washed and treated with a mixture of nitrogen and hydrogen. After drying, the pore size distribution was measured. The pore size distribution is shown in FIG. 4.

The activated carbon was incorporated into a button cell as described earlier. The volumetric specific capacitance of the carbon electrode was about 95 F/cm$^3$, which when taken together with the results of the previous examples supports a conclusion that the pore size distribution of the activated carbon impacts the energy density irrespective of the choice of starting material.

Example 5

The microporous carbon materials can be characterized using Raman spectroscopy. Raman data were collected using a Renishaw in Via Raman spectrometer with a Leica Model DM2000 microscope (50× objective lens) and a silicon-based CCD detector using an incident argon ion laser (488 nm) or a filtered diode laser (785 nm). The spectral resolution of the detector at 488 nm incidence was 1.5 cm$^{-1}$ at 1500 cm$^{-1}$, and the resolution at 785 nm incidence was 1.0 cm$^{-1}$ at 1500 cm$^{-1}$.

In order to minimize damage to the carbon samples, neutral density filters were used to reduce the laser power, and the incident power was typically less than 5 mW (e.g., 1 mW or less for the 488 nm laser, and 2 mW or less for the 785 nm laser). The laser spot size was limited to 10 microns in diameter. The exposure time ranged from 30 to 120 sec in order to improve the signal-to-noise ratio.

Figure 5:
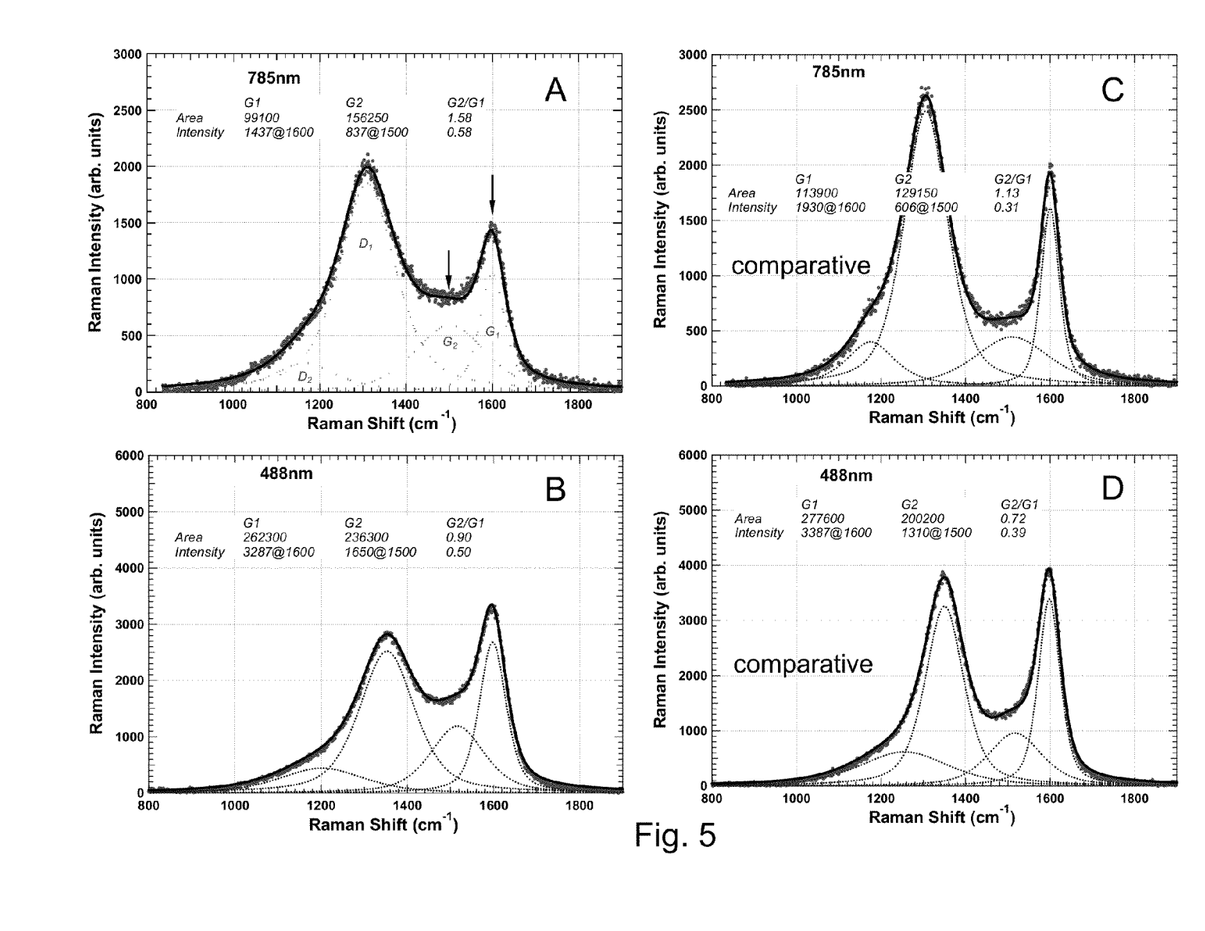
FIGS. 5A-5D show Raman spectroscopy data for microporous activated carbon materials (A and B) and comparative activated carbon materials (C and D).

Representative Raman spectra are shown in FIG. 5. FIGS. 5A and 5B show data for inventive microporous activated carbon (corresponding to Sample 4 in Table 3) for 785 nm and 488 nm excitation, respectively, while FIGS. 5C and 5D show corresponding data for comparative, commercially-available Kuraray YP50F activated carbon.

The Raman data were fitted with four characteristic peaks (D2, D1, G2, G1). In addition to peak locations, additional fitting parameters were peak intensity, width, and shape, with the latter being fit as a mixed function of Gaussian and Lorentzian contributions. Without wishing to be bound by theory, it is believed that the G1 and D1 peaks are attributable to the order structure of honeycomb networks, while the G2 and D2 peaks are attributable to the disorder structure with bond-angle distortion in the networks.

The peak positions for each of D2, D1, G2 and G1 are a function of the incident laser wavelength. The respective peak positions are tabulated in Table 4 for both the argon ion laser and the filtered diode laser.

TABLE 4

Peak positions as a function of incident laser wavelength

| Incident wavelength [nm] | Peak position [cm$^{-1}$] | | | |
|---|---|---|---|---|
| | D2 | D1 | G2 | G1 |
| 488 | 1225 ± 30 | 1351 ± 5 | 1516 ± 5 | 1598 |
| 785 | 1160 ± 15 | 1308 ± 5 | 1505 ± 5 | 1600 |

Fitting analysis on a linear background was conducted on all the Raman spectra in the region from 800 to 1900 cm$^{-1}$. The peak shapes of the fitted data are from about 30 to 60% Gaussian.

Referring to FIG. 5, the presently-disclosed microporous activated carbon as well as commercially-available Kuraray carbon can be characterized by a ratio of fitted Raman peak intensities or areas. In an embodiment, a ratio of G2/G1 peak parameters (intensity ratios or area ratios) can be used to distinguish the microporous carbon materials of the present disclosure from the commercially-available carbons. Table 5 summarizes the G2/G1 ratios for each tested carbon at both incident wavelengths. For the ratio of peak intensities, the G2/G1 ratio was approximated by the ratio of intensities at 1500 cm$^{-1}$ and 1600 cm$^{-1}$ following baseline correction. The ratio of peak intensities, G2/G1, is believed to be related to the content of disorder structure.

TABLE 5

G2/G1 area and intensity ratios for activated carbons

| | Microporous Activated Carbon | | Kuraray Carbon (comparative) | |
|---|---|---|---|---|
| | 488 nm | 785 nm | 488 nm | 785 nm |
| G2/G1 | 0.90 | 1.58 | 0.72 | 1.13 |
| $I_{1500}/I_{1600}$ | 0.50 | 0.58 | 0.39 | 0.31 |

It can be seen from the Raman data that the presently-disclosed microporous activated carbons are more amorphous than the commercially-available activated carbons. Without wishing to be constrained by theory, although it is believed that a higher degree of amorphous character results in lower charge carrier mobility, the higher conductivity of the presently-disclosed microporous activated carbons is believed to be due to a comparatively higher carrier density, where the conductivity is proportional to the product of carrier density and mobility.

In an embodiment, the microporous activated carbon materials according to the present disclosure can be characterized by a G2/G1 ratio (area/area) of at least 0.8 (e.g., at least 0.8, 0.85 or 0.9) for 488 nm excitation, and/or a G2/G1 ratio (area/area) of at least 1.25 (e.g., at least 1.25, 1.30, 1.35, 1.40, 1.45, 1.50 or 1.55) for 785 nm excitation. In a further embodiment, the microporous activated carbon materials according to the present disclosure can be characterized by a G2/G1 ratio (intensity/intensity) of at least 0.4 (e.g., at least 0.4, 0.45 or 0.5) for 488 nm excitation and/or at least 0.4 (e.g., at least 0.4, 0.45 or 0.5) for 785 nm excitation.

This disclosure provides activated carbon materials for EDLC applications. The activated carbon materials can be characterized by high microporosity. Such carbons provide high specific capacitance and in turn, high energy storage capacity and long term stability in EDLCs. Methods for making such activated carbon materials are also disclosed.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An electric double layer capacitor electrode comprising microporous carbon, wherein the microporous carbon comprises:
   pores having a size of ≦1 nm, which provide a combined pore volume of ≧0.4 cm$^3$/g;
   pores having a size of from >1 nm to ≦2 nm, which provide a combined pore volume of ≧0.05 cm$^3$/g; and
   <0.15 cm$^3$/g combined pore volume of any pores having a size of >2 nm.

2. An electric double layer capacitor electrode of claim 1, wherein the pores having a size of from >1 nm to ≦2 nm provide a combined pore volume of ≧0.1 cm$^3$/g.

3. An electric double layer capacitor electrode of claim 1, wherein the pores having a size of from >1 nm to ≦2 nm provide a combined pore volume of ≧0.15 cm$^3$/g.

4. An electric double layer capacitor electrode of claim 1, wherein the microporous carbon comprises <0.1 cm$^3$/g combined pore volume of any pores having a size of >2 nm.

5. An electric double layer capacitor electrode of claim 1, wherein the microporous carbon comprises <0.05 cm$^3$/g combined pore volume of any pores having a size of >2 nm.

6. An electric double layer capacitor electrode of claim 1, wherein the microporous carbon comprises pores having a size of from >0.5 nm to ≦1 nm, which provide a combined pore volume of ≧0.3 cm$^3$/g.

7. An electric double layer capacitor electrode of claim 1, wherein the microporous carbon comprises a total pore volume of ≧0.45 cm$^3$/g.

8. An electric double layer capacitor electrode of claim 1, wherein the microporous carbon comprises a total pore volume of ≧0.70 cm$^3$/g.

9. An electric double layer capacitor electrode of claim 1, wherein pores having a size of ≦2 nm provide a combined pore volume of >95% of the total pore volume of the carbon.

10. An electric double layer capacitor electrode of claim 1, wherein pores having a size of ≦1 nm provide a combined pore volume of >60% of the total pore volume of the carbon.

11. An electric double layer capacitor electrode of claim 1, wherein the microporous carbon has a structural order ratio (SOR) less than or equal to 0.08, and a nitrogen content greater than 0.1 wt. %.

12. An electric double layer capacitor electrode of claim 1, wherein the microporous carbon has an oxygen content less than 3 wt. %.

13. An electric double layer capacitor electrode of claim 1, wherein the microporous carbon has a structural order ratio (SOR) less than or equal to 0.08, a nitrogen content greater than 0.1 wt. %, and an oxygen content less than 3 wt. %.

14. An electric double layer capacitor electrode of claim 1, wherein the microporous carbon has a specific surface area greater than or equal to 300 m$^2$/g.

15. An electric double layer capacitor electrode of claim 1, wherein the microporous carbon has a G2/G1 ratio (intensity/intensity) of at least 0.4 for 488 nm excitation.

16. An electric double layer capacitor electrode of claim 1, wherein the microporous carbon has a G2/G1 ratio (intensity/intensity) of at least 0.4 for 785 nm excitation.

17. An electric double layer capacitor electrode comprising microporous carbon, wherein the microporous carbon comprises:
- pores having a size of $\leq 1$ nm, which provide a combined pore volume of $\geq 0.3$ cm$^3$/g;
- pores having a size of from $>1$ nm to $\leq 2$ nm, which provide a combined pore volume of $\geq 0.05$ cm$^3$/g; and
- $<0.15$ cm$^3$/g combined pore volume of any pores having a size of $>2$ nm, wherein pores having a size of $\leq 1$ nm provide a combined pore volume of $>60\%$ of the total pore volume of the carbon.

* * * * *